(12) United States Patent
Thrower

(10) Patent No.: US 6,443,587 B2
(45) Date of Patent: Sep. 3, 2002

(54) COMBINATION FLASHLIGHT AND AUDIO RECORDER ASSEMBLY

(76) Inventor: Wallace Jackson Thrower, P.O. Box 334, Pineville, NC (US) 28134

( * ) Notice: Subject to any disclaimer, the term of this patent is extended or adjusted under 35 U.S.C. 154(b) by 0 days.

(21) Appl. No.: 09/950,348

(22) Filed: Sep. 10, 2001

Related U.S. Application Data

(63) Continuation of application No. 09/513,956, filed on Feb. 28, 2000, now Pat. No. 6,286,973.

(51) Int. Cl.[7] ............................................... H04M 1/22
(52) U.S. Cl. ........................ 362/86; 362/109; 362/253; 362/208; 340/438
(58) Field of Search ........................... 362/86, 109, 253, 362/102, 208; D26/38, 52; 340/438

(56) References Cited

U.S. PATENT DOCUMENTS 5,844,472 A * 12/1998 Lee ............................. 340/438
D408,935 S     4/1999 Wan
6,076,063 A * 6/2000 Unno et al. .................. 704/500

* cited by examiner

*Primary Examiner*—Sandra O'Shea
*Assistant Examiner*—Ali Alavi
(74) *Attorney, Agent, or Firm*—Adams, Schwartz & Evans, P.A.

(57) ABSTRACT

A combination handheld flashlight and audio recorder assembly. The assembly includes a housing having a hollow interior, and defining a handle for being gripped by a user. A light is contained within the assembly housing, and is adapted for being activated by the user to project light outwardly from the assembly housing to a selected area. An audio recorder is also contained within the assembly housing. The audio recorder includes a microphone for receiving sound messages delivered by the user and a memory medium to store the sound messages for subsequent playback by the user.

14 Claims, 6 Drawing Sheets

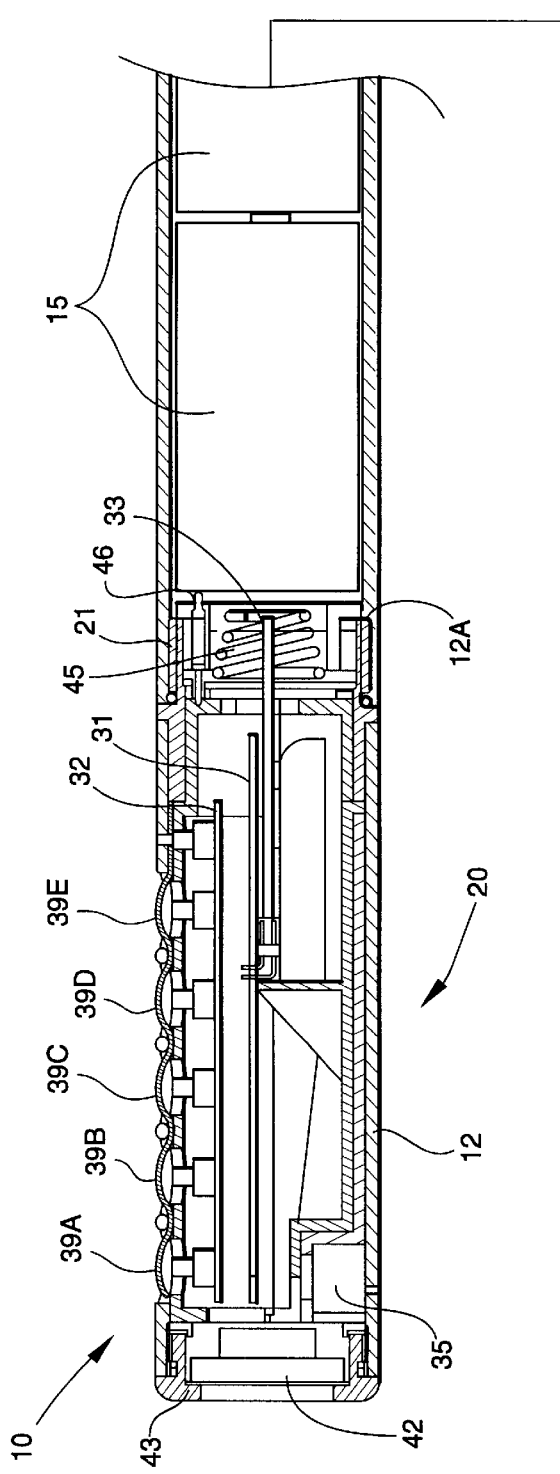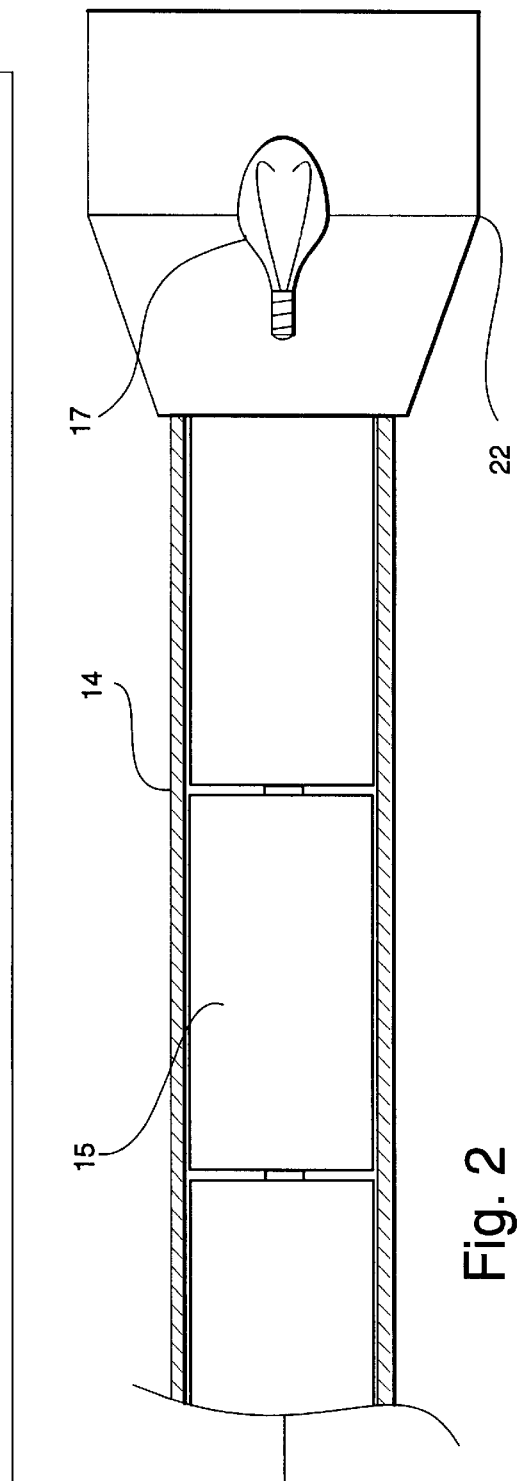
Fig. 2

COMBINATION FLASHLIGHT AND AUDIO RECORDER ASSEMBLY

This application is a continuation of and claims priority to patent application Ser. No. 09/513,956, filed Feb. 28, 2000, which issued as U.S. Pat. No. 6,286,973 B1 on Sep. 11, 2001. This invention relates to a combination flashlight and audio recorder assembly. The assembly resembles a conventional handheld flashlight, is lightweight, and allows its user to conveniently record voice messages while simultaneously inspecting dark areas using the flashlight component of the invention. The invention is especially applicable for use by professionals in the law enforcement, fire safety and industrial safety industries, as well as other professionals for inspections in dark areas.

TECHNICAL FIELD AND BACKGROUND OF INVENTION

The use of standard handheld flashlights, such as those commercially available under the trademarks "Mag-Lite" and "Streamlight", is quite common in certain professional safety industries. Professionals working in these industries commonly perform inspections at, for example, crime scenes, homes, and industrial facilities. During an inspection, the professional is generally unable to effectively record the details of information gathered and will often wait until after the inspection is completed before writing down the information on paper. In some cases, important details of the inspection are simply forgotten or inaccurately described. In other cases, where the professional attempts to write down information at the time of the inspection, the procedure proves to be not only time consuming, but especially awkward and difficult.

SUMMARY OF THE INVENTION

Therefore, it is an object of the invention to provide a combination handheld flashlight and audio recorder assembly which is especially applicable for use by professionals in law enforcement, fire, industrial, and other safety industries.

It is another object of the invention to provide a combination handheld flashlight and audio recorder assembly which uses a miniature, high quality digital recorder.

It is another object of the invention to provide a combination handheld flashlight and audio recorder assembly wherein the digital recorder is powered by DC5.5V+ rechargeable Nickel Cadmium batteries.

It is another object of the invention to provide a combination handheld flashlight and audio recorder assembly which is durable.

It is another object of the invention to provide a combination handheld flashlight and audio recorder assembly which is water resistant, i.e., "shower proof".

It is another object of the invention to provide a combination handheld flashlight and audio recorder assembly which is capable of continuous recording for approximately 30 minutes.

It is another object of the invention to provide a combination handheld flashlight and audio recorder assembly which uses a solid state, removable memory card for storing recorded material.

It is another object of the invention to provide a combination handheld flashlight and audio recorder assembly which includes a voice indicator function for separately identifying each recorded message.

It is another object of the invention to provide a combination handheld flashlight and audio recorder assembly which uses a built-in condenser microphone.

It is another object of the invention to provide a combination handheld flashlight and audio recorder assembly which uses a built-in, high quality speaker.

It is another object of the invention to provide a combination handheld flashlight and audio recorder assembly which includes a number of user function buttons operable for playing/pausing recorded voice messages, recording new messages, stopping recording or playback, returning to previous messages, forwarding to subsequent messages, and deleting messages.

It is another object of the invention to provide a combination handheld flashlight and audio recorder assembly which includes a removable memory card which can be inserted and played in a separate playback device.

It is another object of the invention to provide a combination handheld flashlight and audio recorder assembly which is relatively lightweight.

It is another object of the invention to provide an audio recorder assembly which can be retrofit to standard, commercially available handheld flashlights.

These and other objects of the present invention are achieved in the preferred embodiments disclosed below by providing a combination handheld flashlight and audio recorder assembly. The assembly includes a housing having a hollow interior, and defining a handle for being gripped by a user. A light is contained within the assembly housing, and is adapted for being activated by the user to project light outwardly from the assembly housing to a selected, predetermined area. An audio recorder is also contained within the assembly housing. The audio recorder includes a microphone for receiving sound messages delivered by the user and a memory medium to store the sound messages for subsequent playback by the user.

According to another preferred embodiment of the invention, the assembly housing includes separate audio recorder and flashlight casings removably mated together at respective proximal ends for containing the audio recorder and the light.

According to yet another preferred embodiment of the invention, the assembly housing is substantially tubular.

According to yet another preferred embodiment of the invention, the diameter of the assembly housing is between 3.5 and 4.5 cm to allow secure and comfortable gripping by the user.

According to yet another preferred embodiment of the invention, the weight of the combination flashlight and audio recorder assembly is less than 1 kg (or, approximately 2.12 lbs).

According to yet another preferred embodiment of the invention, the memory medium includes a removable memory card.

According to yet another preferred embodiment of the invention, the assembly housing includes a battery storage area for storing one or more batteries used to activate the light.

According to yet another preferred embodiment of the invention, a playback means is provided for playing back the sound messages stored in the memory medium to the user.

According to yet another preferred embodiment of the invention, the playback means includes a speaker contained in the assembly housing for radiating the sound messages stored in the memory medium outwardly from the assembly housing to the user.

According to yet another preferred embodiment of the invention, the assembly housing includes a removable back cap with openings for permitting passage of sound outwardly from the speaker.

According to yet another preferred embodiment of the invention, a plurality of user-activated switches are provided for controlling the recording and playback of sound messages stored in the memory medium.

In yet another embodiment, the invention is an audio recorder assembly which is adapted for being attached to a conventional handheld flashlight. The assembly includes an audio recorder casing defining a hollow interior and having opposing distal and proximal ends. The proximal end of the casing is adapted for mating attachment to an end of the flashlight. An audio recorder is contained within the casing, and includes a microphone for receiving sound messages delivered by a user and a memory medium to store the sound messages for subsequent playback by the user.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 2 is a longitudinal cross-section of the combination flashlight and audio recorder assembly;

DESCRIPTION OF THE PREFERRED EMBODIMENT AND BEST MODE

Figure 1:
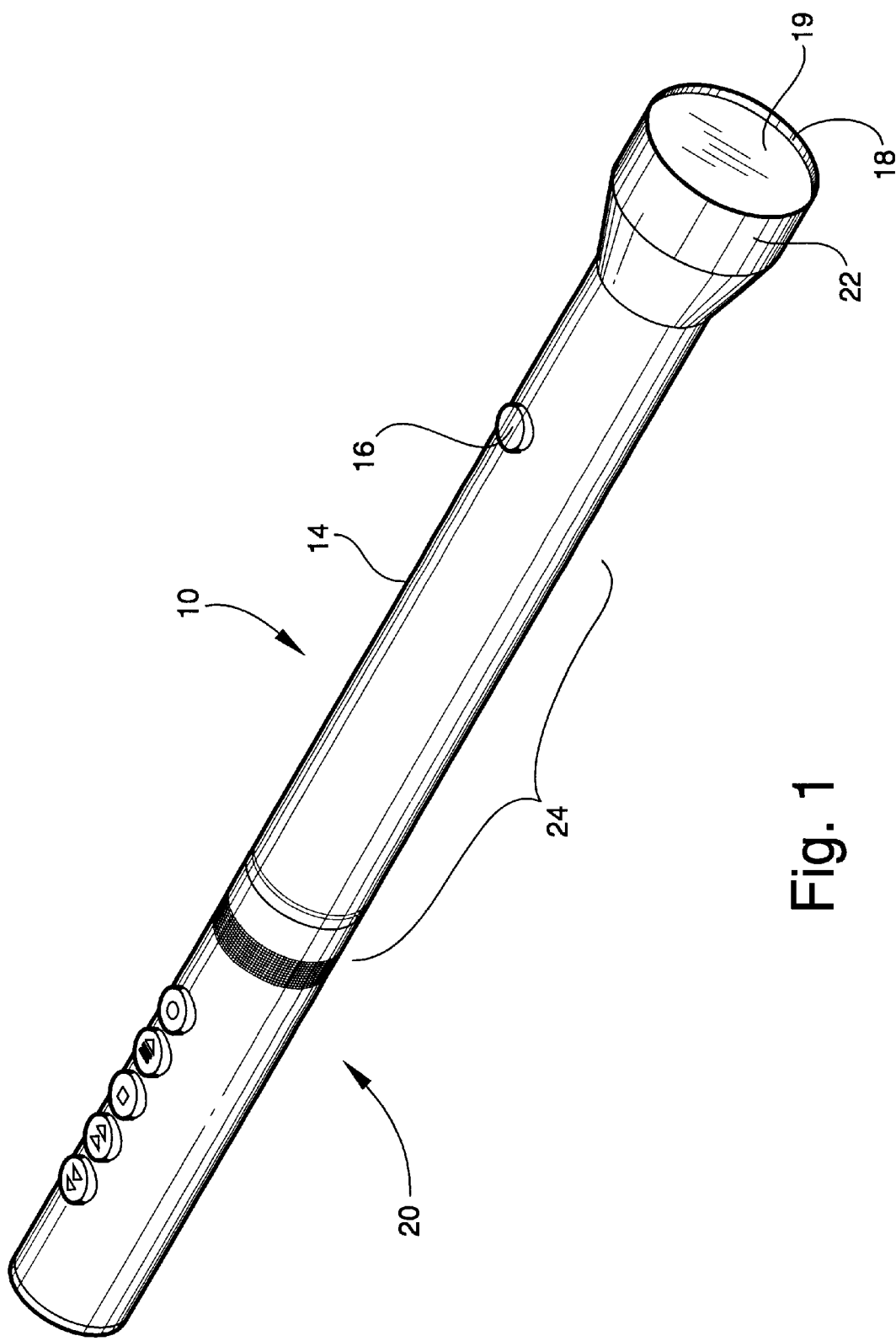
FIG. 1 is a perspective view of a combination handheld flashlight and audio recorder assembly according to one preferred embodiment of the invention.
Figure 3:
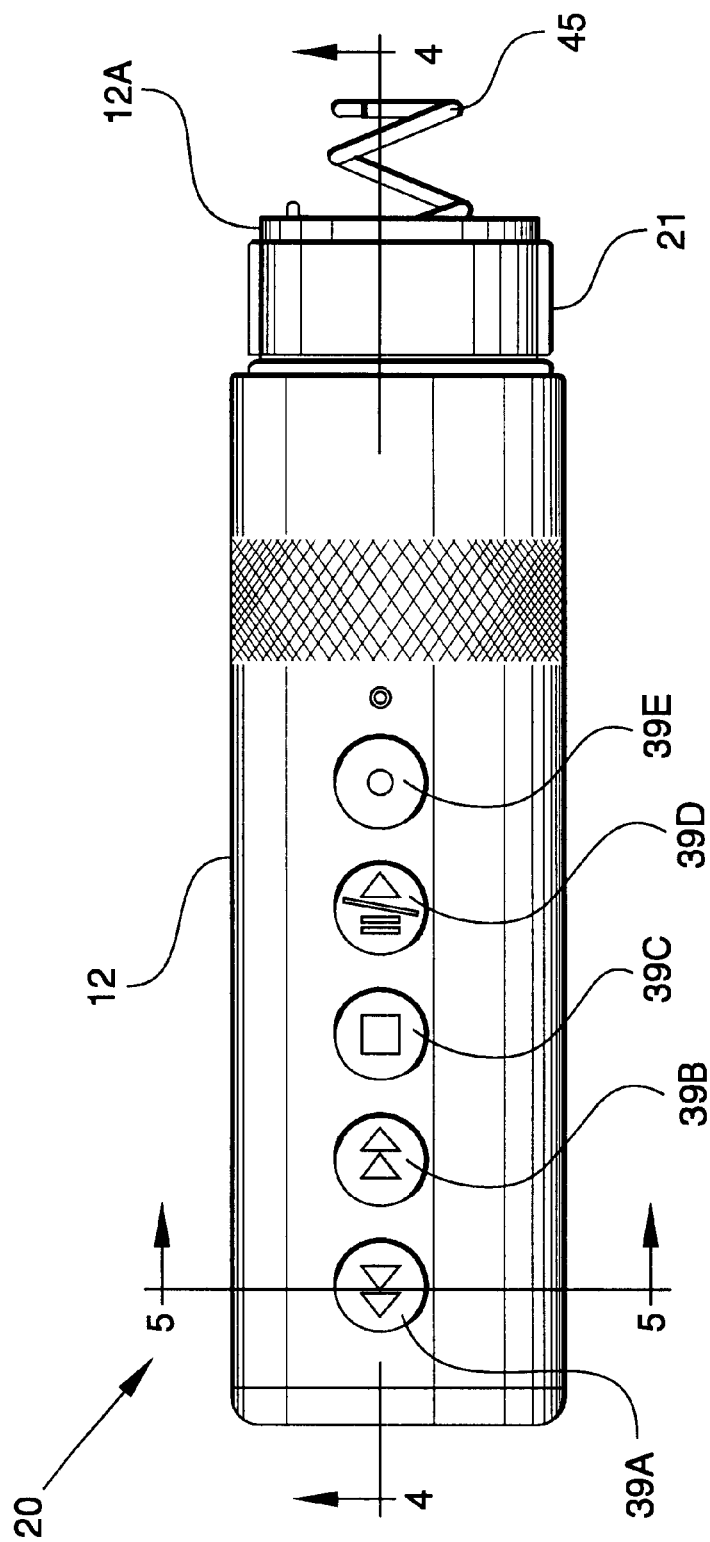
FIG. 3 is a plan view of the audio recorder assembly removed from the flashlight, and showing the manual push buttons used for controlling operation of the assembly.
Figure 4:
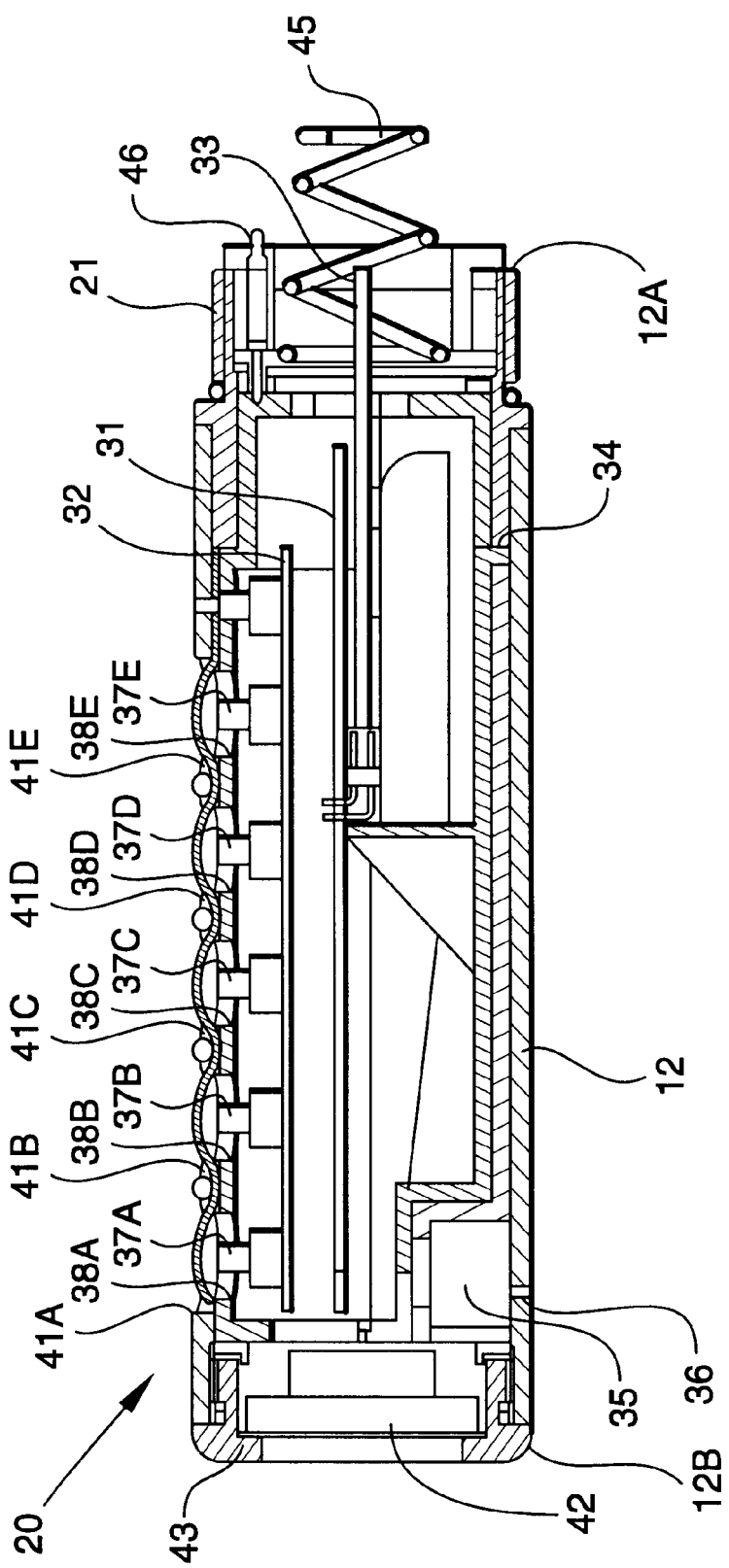
FIG. 4 is a cross-sectional view taken substantially along line 4–4 of FIG. 3.
Figure 5:
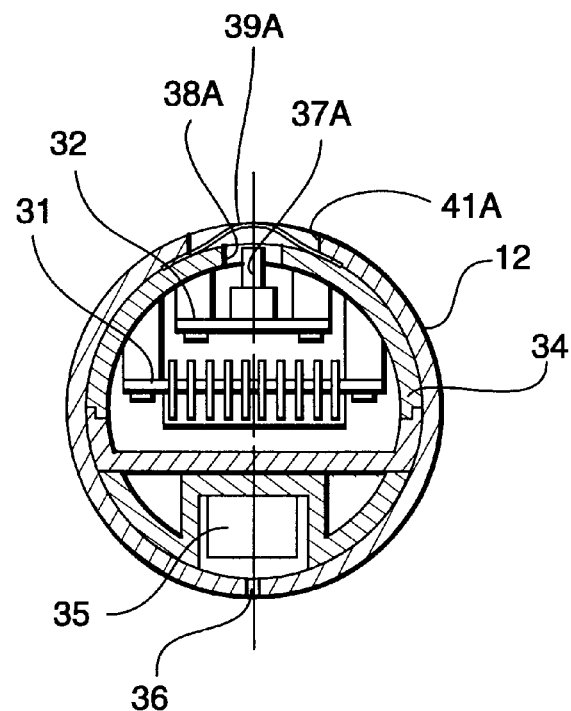
FIG. 5 is a cross-sectional view taken substantially along line 5–5 of FIG. 3.

Referring now specifically to the drawings, a combination handheld flashlight and audio recorder assembly according to the present invention is illustrated in FIG. 1 and shown generally at reference numeral 10. The assembly 10 is especially applicable in the law enforcement industry for recording voice messages of police officers and investigating agents as they inspect a crime scene, perform a search, make an arrest, or question a suspect or witness.

As shown in FIGS. 1 and 2, the assembly 10 includes a tubular exterior housing with separate audio recorder and flashlight casings 12 and 14 joined together at their respective proximal ends. The flashlight casing 14 resembles that of a conventional handheld flashlight and contains interior components, such as batteries 15, an activation switch 16, and a bulb 17, which function in a conventional manner to control output of light through an end 18 of the assembly 10. The end 18 is typically covered with a transparent glass or plastic lens 19. The flashlight casing 14 may hold from three to six C-cell or D-cell batteries, and has a preferred candlepower of between 15,000 and 20,000.

The audio recorder casing 12 contains interior components of the audio recorder assembly 20, described further below. The end diameter of the audio recorder casing 12 is preferably slightly smaller than the end diameter of the flashlight casing 14 such that the casing are frictionally secured to each other and form a water-resistant seal when joined together. An aluminum ring adapter 21 may be included on the end 12A of the audio recorder casing 12 to enhance frictional attachment of these components. In an alternative embodiment, the ends of the casings 12 and 14 have complementary screw threads (not shown) which mate to removable join the casings together.

Preferably, the assembly housing further defines an enlarged head 22 for protecting the bulb 17 of the flashlight, and an elongate handle portion 24 having an outer diameter which is sufficiently small to be easily gripped by the user. In this embodiment, the outer diameter of the handle portion 24 is between 3.5 and 4.5 cm. The overall length of the assembly 10 is preferably between 40 and 45 cm.

Figure 6:
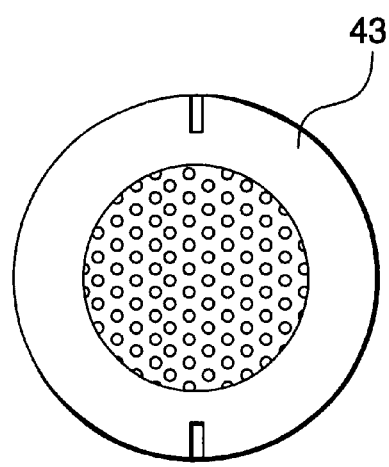
FIG. 6 is an end view of the combination flashlight and audio recorder assembly, and showing the perforations in the back cap for allowing radiation of sound outwardly from the assembly.

Referring now to FIGS. 3–6, the audio recorder assembly 20 includes a main board 31, a function keyboard 32, and a removable memory card 33 stored within an inner casing 34. The memory card 33 is electronically connected to the main board 31 and a built-in condenser microphone 35 to receive and store electric signals corresponding to sound messages delivered by a user through a small sound port 36 in the outer casing 12. The function keyboard 32 has manual switches 37A–37E which extend through respective openings 38A–38E formed with the inner casing 34, and are selectively actuated by the user to control playing/pausing, message recording, stopping, rewinding, forwarding, and message deleting. Preferably, the switches 37A–37E are covered by integrally-formed silicone rubber push buttons 39A–39E at respective openings 41A–41E in the outer casing 12. The electric signals stored on the memory card 33 during recording are subsequently converted to sound waves and transmitted to the user during playback of the memory card 33 using a small built-in speaker 42 electronically connected to the main board 31. The speaker 42 is positioned adjacent a free end 12B of the audio recorder casing 12, and is readily accessed by the user through a removable back cap 43. As shown in FIG. 6, the back cap 43 is perforated to allow radiation of sound outwardly from the speaker 42. The audio recorder assembly 20 is preferably powered by one or more DC5.5V+ rechargeable Nickel Cadmium batteries (not shown).

Figure 7:
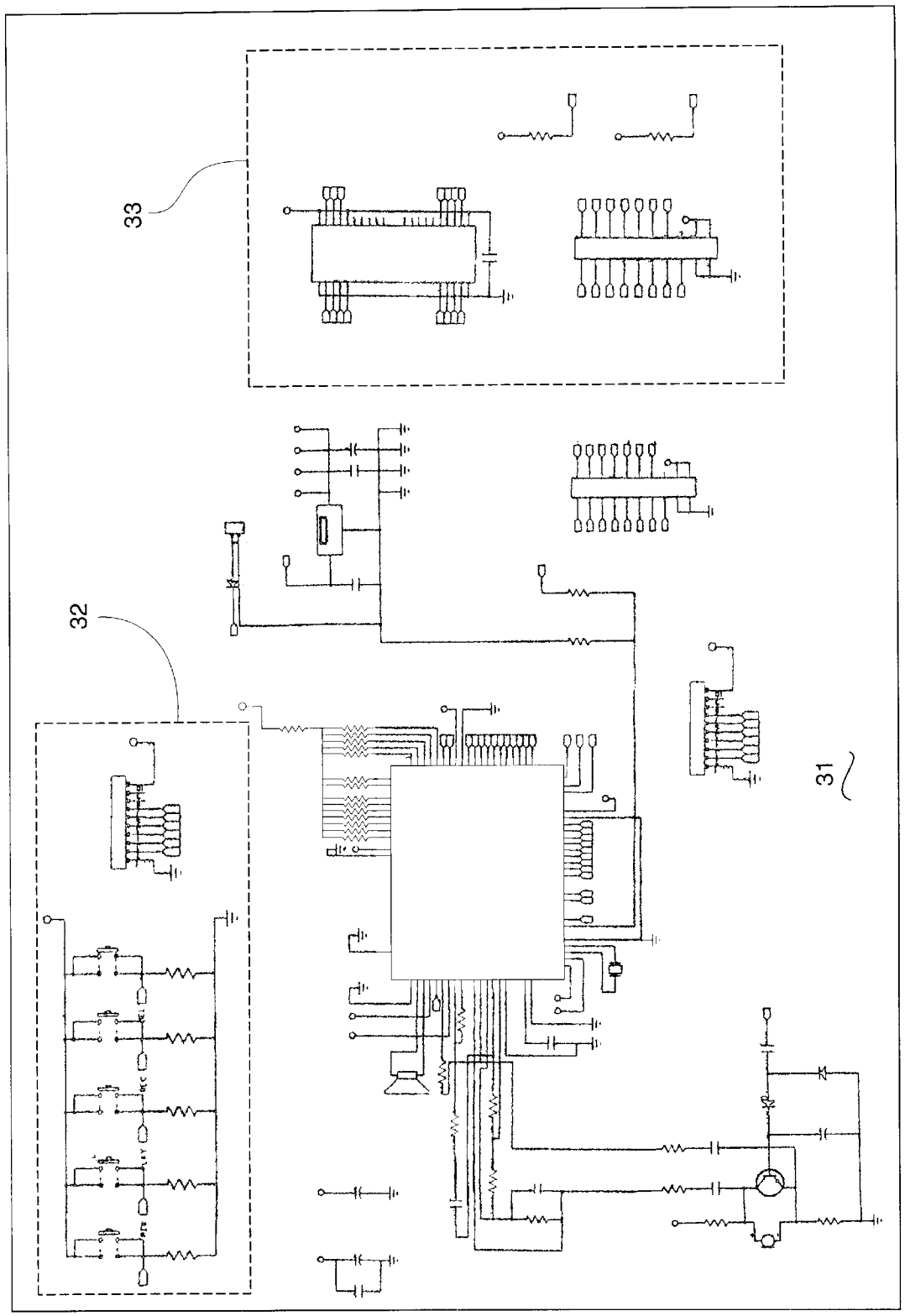
FIG. 7 is an electronic schematic diagram of certain electronic components of the assembly, including the main board, keyboard, and memory card.

An electronic schematic of the main board 31 is shown in FIG. 7. The function keyboard 32 and removable memory card 33 are indicated in phantom.

Upon assembly of the invention, as best shown in FIG. 2, a metal spring 45 extending from the proximal end 12A of the audio recorder casing 12 engages a rear battery 15 in the flashlight casing 14 to maintain the series of batteries 15 in operative contact and to form a negative pole. A brass finger 46 extends outwardly from the audio recorder casing 12 adjacent the spring 45, and engages the rear battery 15 to form the positive pole.

In an alternative application of the invention, the audio recorder assembly 20 is adapted for use as a retrofit item in combination with a standard handheld flashlight, such as those commercially available under the trademarks "Mag-Lite" and "Streamlight". Such commercial flashlights typically have a removable back cap for conveniently inserting and replacing batteries. The back cap generally has a screw thread which mates with a complementary thread formed with an end of the flashlight. In this application, the audio recorder assembly has a threaded proximal end which is adapted to mate with the threaded end of the flashlight to operatively attach the audio recorder assembly and flashlight together.

In addition, the digital memory card 33 may be removed from the audio recorder assembly 20 of the present invention and replayed in a separate playback unit (not shown). For this reason, it is not essential that the audio recorder assembly include a speaker or other audio playback means.

A combination handheld flashlight and audio recorder assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A combination handheld flashlight and audio recorder assembly, comprising:
    (a) an assembly housing comprising removably joined audio recorder and flashlight casings;
    (b) a light contained within said flashlight casing, and adapted for being activated by the user to project light outwardly from said assembly housing; and
    (c) an audio recorder contained within said audio recorder casing, and comprising a microphone for receiving sound messages delivered by the user and a memory medium to store the sound messages for subsequent playback by the user;
    whereby said flashlight and audio recorder casings are readily separable for independent operation of said light and said audio recorder.

2. A combination flashlight and audio recorder assembly according to claim 1, wherein the weight of said combination flashlight and audio recorder assembly is less than 1 kg.

3. A combination flashlight and audio recorder assembly according to claim 1, wherein said memory medium comprises a removable memory card.

4. A combination flashlight and audio recorder assembly according to claim 1, wherein said assembly housing comprises a battery storage area for storing a battery used to activate said light.

5. A combination flashlight and audio recorder assembly according to claim 1, and comprising playback means for playing back the sound messages stored in said memory medium to the user.

6. A combination flashlight and audio recorder assembly according to claim 1, wherein said playback means comprises a speaker contained in said assembly housing for radiating the sound messages stored in said memory medium outwardly from said assembly housing to the user.

7. A combination flashlight and audio recorder assembly according to claim 1, wherein said assembly housing comprises a removable back cap with openings for permitting passage of sound outwardly from said speaker.

8. A combination flashlight and audio recorder assembly according to claim 1, and comprising a plurality of user-activated switches for controlling the recording and playback of sound messages stored in said memory medium.

9. An audio recorder assembly adapted for attachment to a handheld flashlight, said assembly comprising:
    (a) an audio recorder casing defining a hollow interior and having opposing distal and proximal ends, the proximal end comprising a tubular flashlight connecting portion adapted for mating attachment to an end of the flashlight;
    (b) an audio recorder contained within said casing, and comprising a microphone for receiving sound messages delivered by a user and a memory medium to store the sound messages for subsequent playback by the user.

10. An audio recorder assembly according to claim 9, wherein said memory medium comprises a removable memory card.

11. An audio recorder assembly according to claim 9, and comprising playback means for playing back the sound messages stored in said memory medium to the user.

12. An audio recorder assembly according to claim 11, wherein said playback means comprises a speaker contained in said casing for radiating the sound messages stored in said memory medium outwardly from said casing to the user.

13. An audio recorder assembly according to claim 9, wherein said casing comprises a removable back cap with openings for permitting passage of sound outwardly from said speaker.

14. An audio recorder assembly according to claim 9, and comprising a plurality of user-activated switches for controlling the recording and playback of sound messages stored in said memory medium.

* * * * *